United States Patent
Ido et al.

(10) Patent No.: US 9,768,935 B2
(45) Date of Patent: Sep. 19, 2017

(54) COMMUNICATION APPARATUS, METHOD FOR CONTROLLING COMMUNICATION APPARATUS, AND PROGRAM

(71) Applicant: CANON KABUSHIKI KAISHA, Tokyo (JP)

(72) Inventors: Tetsuo Ido, Yokohama (JP); Eiji Imao, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/778,270

(22) PCT Filed: Feb. 17, 2014

(86) PCT No.: PCT/JP2014/000808
§ 371 (c)(1),
(2) Date: Sep. 18, 2015

(87) PCT Pub. No.: WO2014/147951
PCT Pub. Date: Sep. 25, 2014

(65) Prior Publication Data
US 2016/0285607 A1    Sep. 29, 2016

(30) Foreign Application Priority Data

Mar. 21, 2013  (JP) .................. 2013-058330

(51) Int. Cl.
*H04W 4/00* (2009.01)
*H04L 5/00* (2006.01)
(Continued)

(52) U.S. Cl.
CPC ............ *H04L 5/0055* (2013.01); *H04L 1/188* (2013.01); *H04L 1/1848* (2013.01);
(Continued)

(58) Field of Classification Search
CPC ... H04L 5/0055; H04L 69/163; H04L 1/1848; H04L 29/08; H04L 1/1854; H04L 1/1864; H04L 1/188
(Continued)

(56) References Cited

U.S. PATENT DOCUMENTS

2006/0233116 A1   10/2006  Kyusojin
2008/0019340 A1*   1/2008  Ohta .................... H04L 1/1671
                                                   370/338
2009/0083570 A1*   3/2009  Shiraishi ................ H04L 69/28
                                                   713/600

FOREIGN PATENT DOCUMENTS

EP           2309675 A1    4/2011
JP        2006-303750 A   11/2006
JP          04746610 B2    8/2011

OTHER PUBLICATIONS

R. Braden; "Requirements for Internet Hosts—Communication Layers;" Network Working Group; Internet Task Force; Oct. 1989; pp. 1-6.

* cited by examiner

*Primary Examiner* — Sai-Ming Chan
(74) *Attorney, Agent, or Firm* — Canon USA, Inc., IP Division

(57) ABSTRACT

A communication apparatus notifies a partner terminal of delayed acknowledgement (ACK) information, and the partner terminal determines a retransmission time out (RTO) minimum value based on the delayed ACK information. The communication apparatus notifies the partner terminal of the delayed ACK information using a transmission control protocol (TCP) header option at the time of a TCP connection, or using an application. Alternatively, the communication apparatus provides the delayed ACK information for an ACK packet when transmitting a delayed ACK. The partner (Continued)

terminal determines the RTO minimum value in such a manner that the RTO minimum value does not fall below an acquired delayed ACK timer value.

20 Claims, 6 Drawing Sheets

(51) Int. Cl.
*H04L 29/08* (2006.01)
*H04L 29/06* (2006.01)
*H04L 1/18* (2006.01)

(52) U.S. Cl.
CPC .......... *H04L 1/1854* (2013.01); *H04L 1/1864* (2013.01); *H04L 29/08* (2013.01); *H04L 69/163* (2013.01)

(58) Field of Classification Search
USPC ........................................................ 370/329
See application file for complete search history.

[Fig. 1]
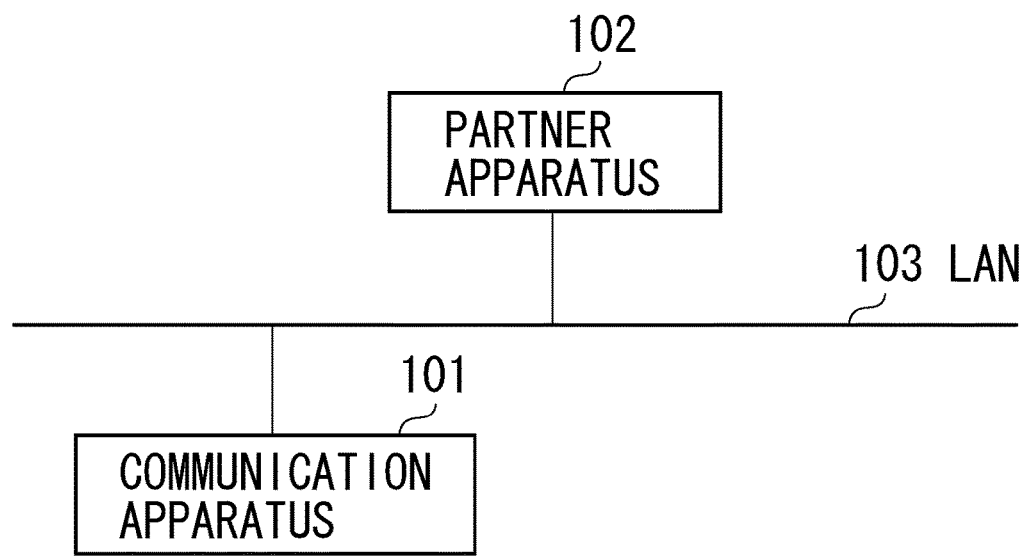

[Fig. 2]
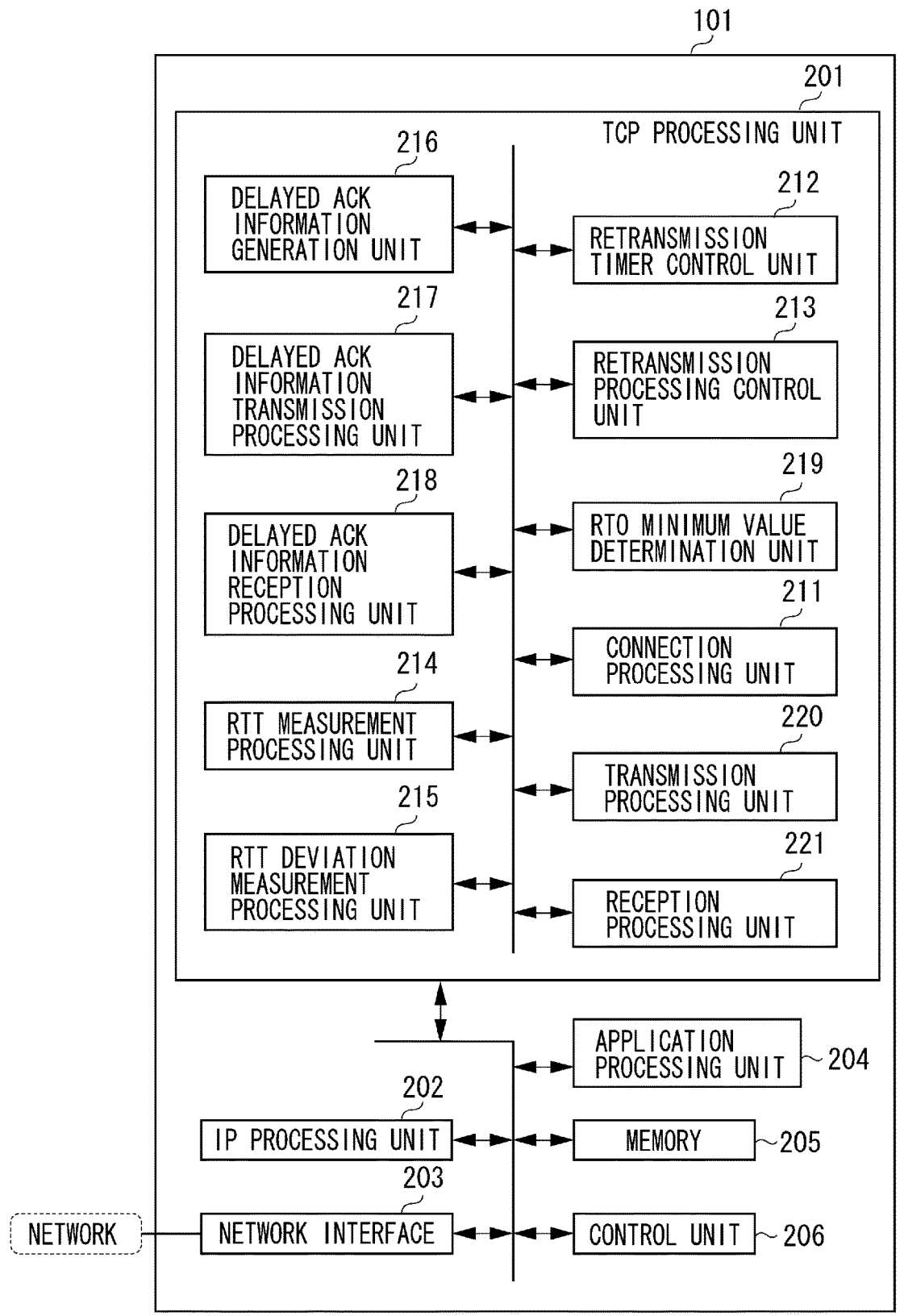

[Fig. 3]
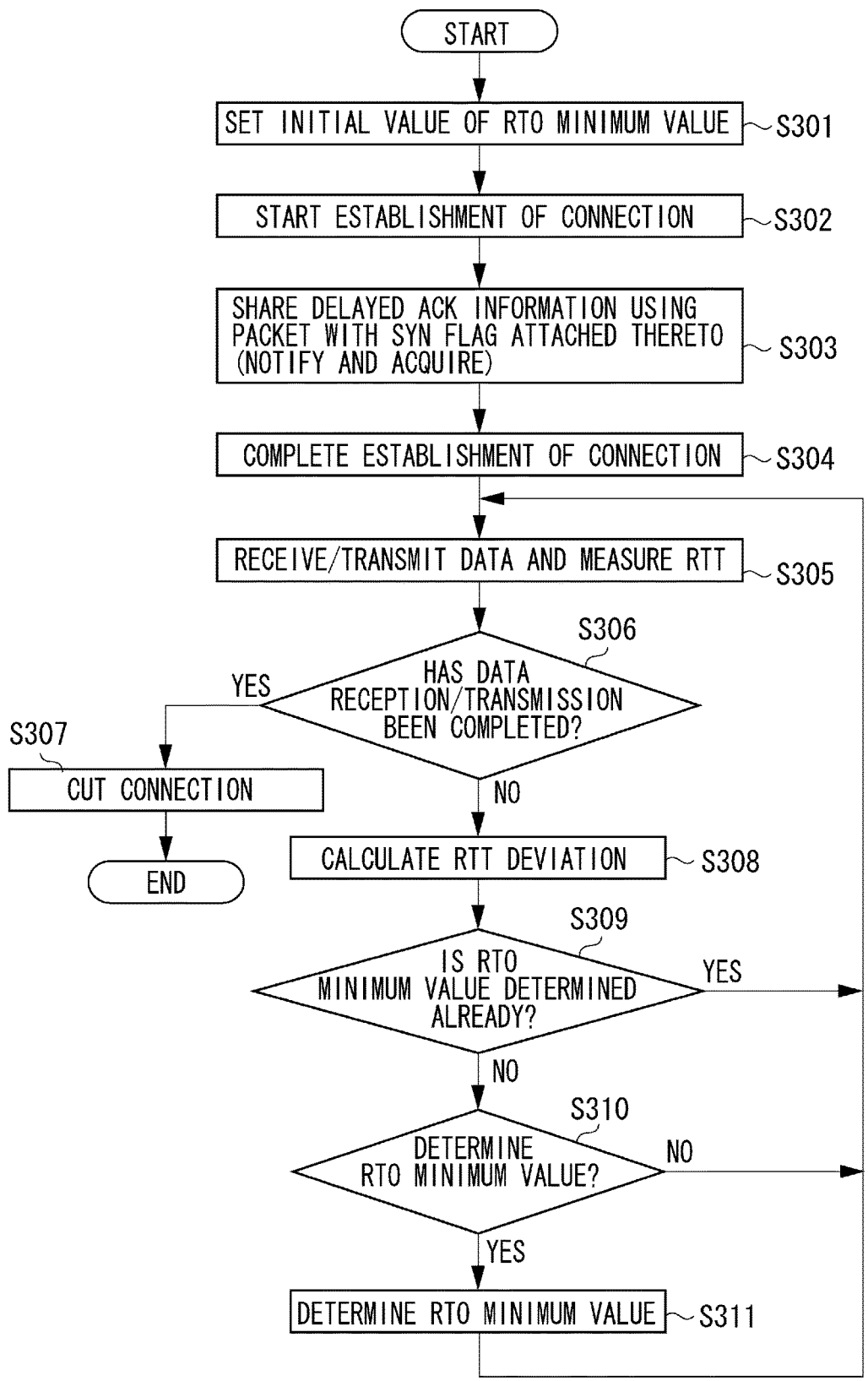

[Fig. 4]
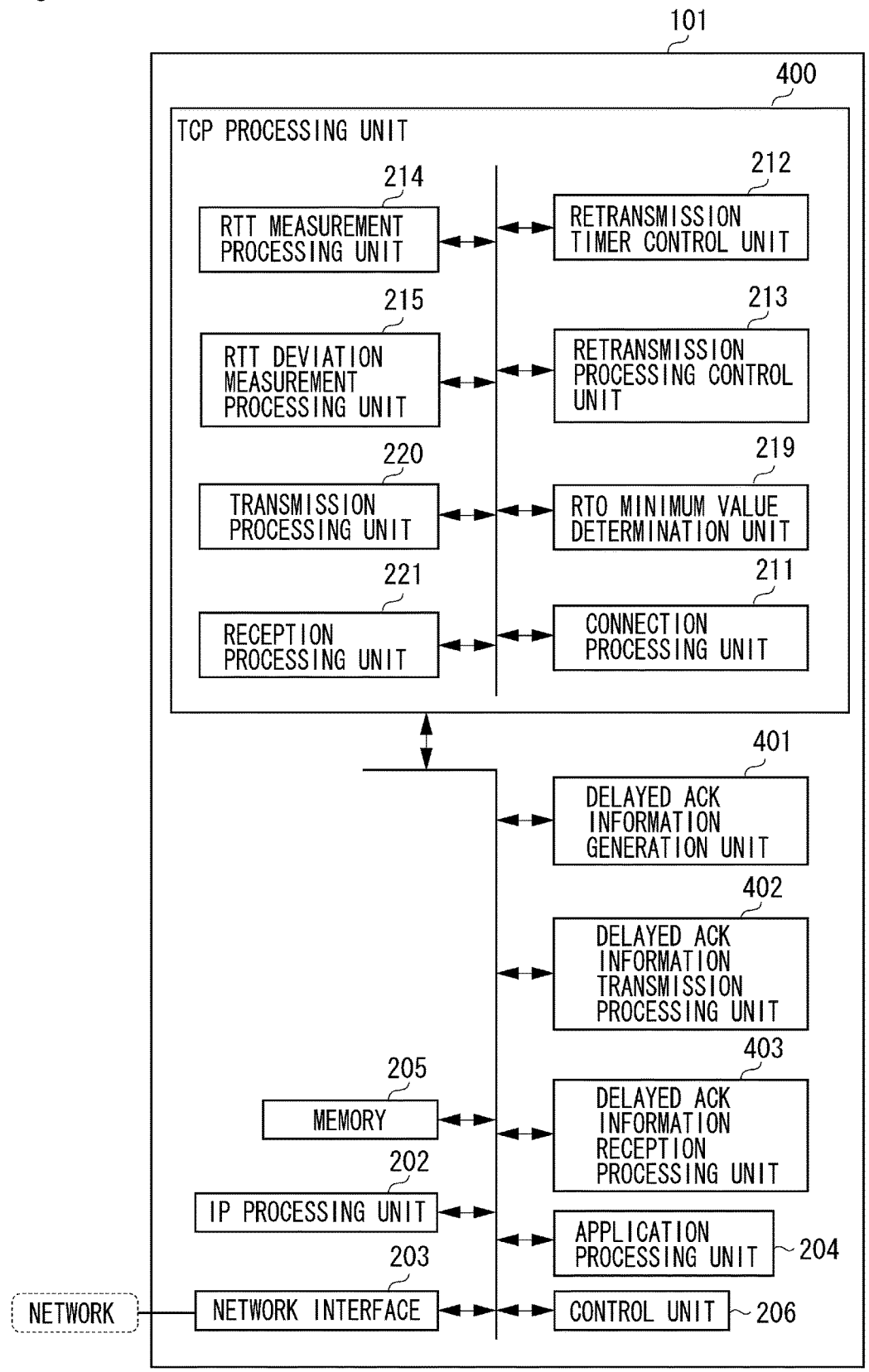

[Fig. 5]
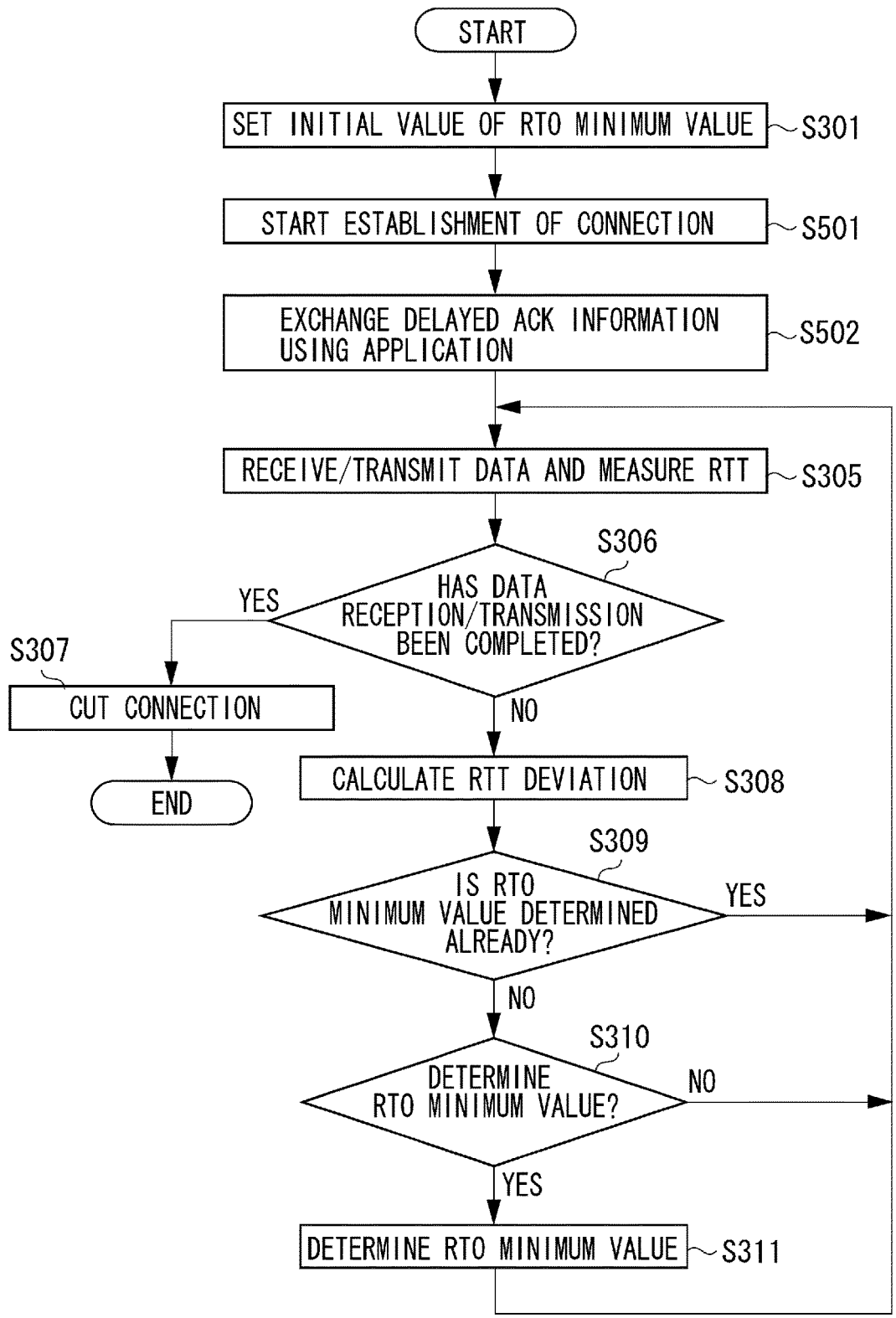

[Fig. 6]
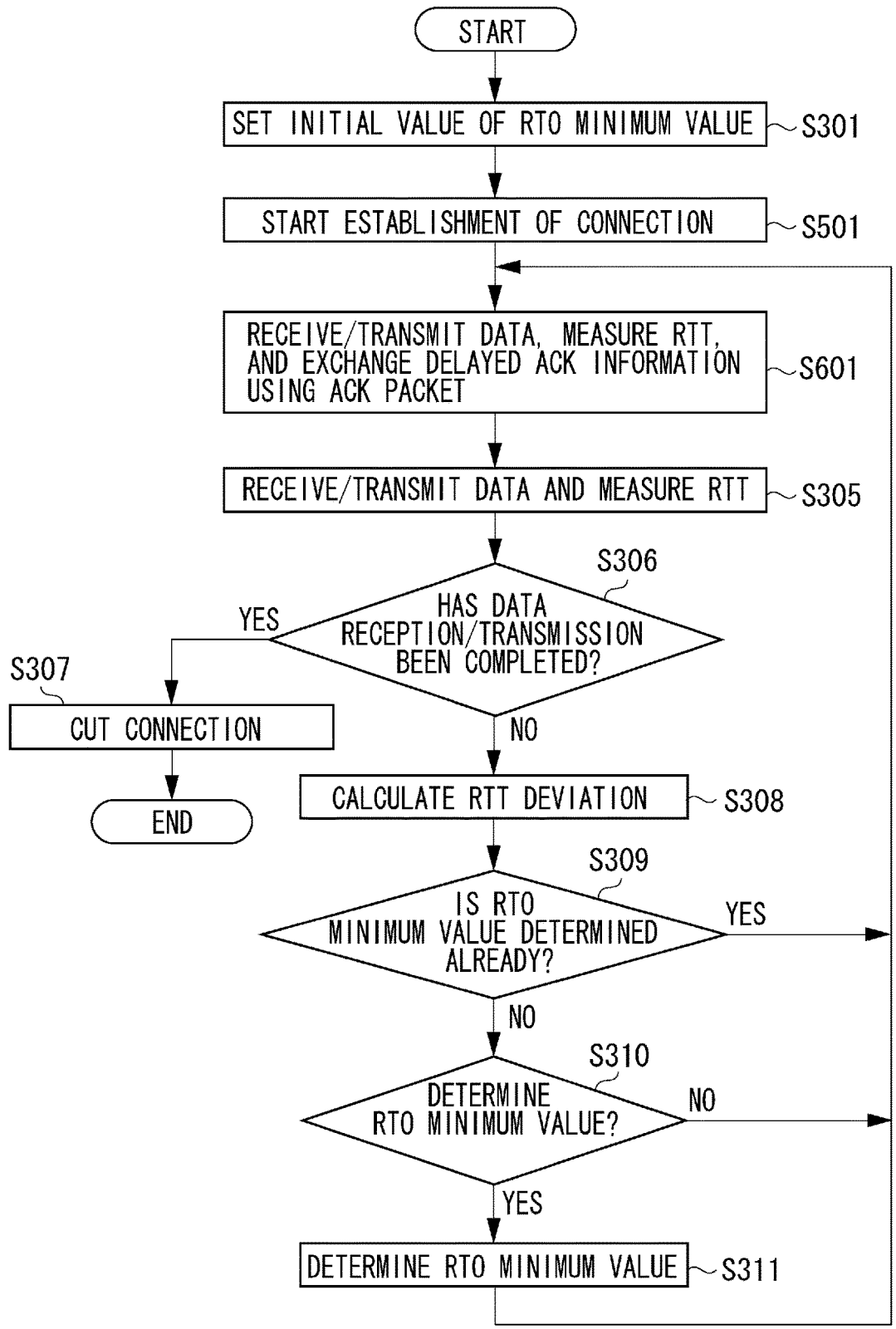

COMMUNICATION APPARATUS, METHOD FOR CONTROLLING COMMUNICATION APPARATUS, AND PROGRAM

TECHNICAL FIELD

The present invention relates to a communication apparatus that replies to a received packet.

BACKGROUND ART

Transmission control protocol (TCP) has a mechanism that causes a reception side of a data packet to return an acknowledgement (ACK) to thereby allow a transmission side to confirm that the data packet has reached the reception side.

TCP specifies a delayed ACK as the reception side transmits a single ACK for data packets of a predetermined number upon reception of the predetermined number of packets (for example, three packets). TCP also specifies that, for the delayed ACK, even if the reception side receives data packets less than the predetermine number of data packets and does not receive a data packet after that, the reception side transmits an ACK when a first predetermined time period has elapsed from reception of the last data packet. This first predetermined time period is referred to a delayed ACK timer value.

On the other hand, TCP specifies data retransmission as the transmission side retransmits the data packet if the transmission side does not receive an ACK for a data packet even after a second predetermined time period has elapsed from transmission of the data packet. This second predetermined time period is referred to a retransmission timer value (Retransmission Time Out, hereinafter referred to as an RTO).

If a retransmission timer value is small compared to a delayed ACK timer value, retransmission of a data packet (spurious retransmission) may frequently occur despite a success in transmission of the data packet. Therefore, the retransmission timer value is set to a sufficiently large value compared to the delayed ACK timer value.

However, the delayed ACK timer value may be set to various values depending on a partner apparatus so that the set value is unknown. Therefore, the retransmission timer value should be set to a larger value than necessary. This is one of causes for a reduction in a communication speed.

SUMMARY OF INVENTION

The present invention is directed to a technique for enabling notification of time period information from reception of a packet to transmission of a reply to the packet.

According to an aspect of the present invention, a communication apparatus comprising: a reception unit configured to receive a packet from another communication apparatus; a transmission unit configured to transmit a reply to the packet received by the reception unit to the other communication apparatus when a predetermined time period has elapsed from the reception of the packet by the reception unit; and a notification unit configured to notify the other communication apparatus of information of the predetermined time period, wherein the transmission unit transmits the reply to the other communication apparatus before the predetermined time period has elapsed if a predetermined number of packets are received by the reception unit.

Further features of the present invention will become apparent from the following description of exemplary embodiments with reference to the attached drawings.

BRIEF DESCRIPTION OF DRAWINGS

FIG. 1 illustrates a configuration diagram of a system.
FIG. 2 illustrates a configuration diagram of a communication apparatus.
FIG. 3 is a flowchart illustrating processing according to a first exemplary embodiment.
FIG. 4 is a block diagram illustrating processing when delayed ACK information is exchanged at an application level.
FIG. 5 is a flowchart illustrating processing according to a second exemplary embodiment.
FIG. 6 is a flowchart illustrating processing according to a third exemplary embodiment.

DESCRIPTION OF EMBODIMENTS

Retransmission timer control processing according to a first exemplary embodiment will be described where each apparatus performs communication in compliance with TCP in an Ethernet network. Transmission control protocol (TCP) is a protocol that corresponds to the transport layer of the OSI (Open System Interconnections) reference model.

A method will be described according to the present exemplary embodiment for notifying a partner apparatus of delayed ACK information with use of a packet to which a synchronization (SYN) flag is attached (hereinafter referred to as a SYN packet) at the time of establishment of a TCP connection. The SYN packet is a request signal for requesting establishment of a TCP connection.

FIG. 1 illustrates a system configuration according to the present exemplary embodiment. This configuration includes a communication apparatus 101 and a partner apparatus 102 each of which is present on a local area network (LAN) 103. The LAN 103 is a local area network in compliance with Ethernet. Hereinafter, the LAN 103 may be also simply referred to as a network. The present exemplary embodiment will be described assuming that the communication apparatus 101 is a digital camera, and the partner apparatus 102 is a personal computer (PC) for storing an image, as an example. However, the present exemplary embodiment is not limited thereto, and the communication apparatus 101 and the partner apparatus 102 may be any combination of a digital camera, a PC, a printer, a storage, a mobile phone (including a smartphone), a portable digital assistant (PDA), a server, and the like.

FIG. 2 illustrates a configuration diagram of the communication apparatus 101. A single functional block illustrated in FIG. 2 may be realized by a plurality of functional blocks. A plurality of functional blocks illustrated in FIG. 2 may be realized as a single functional block. Further, the partner apparatus 102 also has a similar configuration to the communication apparatus 101, and, therefore, the description thereof is omitted.

A TCP processing unit 201 performs protocol processing of TCP. An Internet Protocol (IP) processing unit 202 performs protocol processing of the IP layer. A network interface 203 transmits a packet to a terminal on the network, and receives a packet from a terminal on the network. According to the present exemplary embodiment, the IP processing unit 202 converts transmission data into an Ethernet packet and transmits it to the Ethernet network, and receives an Ethernet packet from the Ethernet network and extracts data from the packet. The Ethernet packet is a packet in compliance with the Ethernet standards.

An application processing unit 204 executes an application in charge of TCP/IP communication. The application is, for example, an image transfer application or a print data transmission application.

A memory 205 stores data handled by the application processing unit 204. For example, the memory 205 stores image data and print data. Further, the memory 205 also stores a program for realizing a flowchart that will be described below.

A control unit 206 controls the whole communication apparatus 101. For example, the control unit 206 controls a series of operations for performing TCP/IP processing on image data, which is prepared in the memory 205 by the application processing unit 204, by the TCP processing unit 201 and the IP processing unit 202, and transmitting a packet from the network interface 203.

The TCP processing unit 201 includes the following processing blocks.

A connection processing unit 211 establishes and cuts a TCP connection. A retransmission timer control unit 212 controls an operation of a TCP retransmission timer. More specifically, the retransmission timer control unit 212 sets a timer time, starts the timer, and stops the timer. A retransmission time out (RTO) value, which is a retransmission timer time, and an RTO minimum value are also stored in the retransmission timer control unit 212. A method for calculating the RTO value and the RTO minimum value will be described below.

A retransmission processing control unit 213 performs TCP retransmission processing when the retransmission timer time has elapsed in the retransmission timer control unit 212. A round trip time (RTT) measurement processing unit 214 measures an RTT, which is a packet reciprocating time period of a transmitted packet. RTT can be acquired by measuring a time period until reception of an ACK to a transmitted data packet.

An RTT deviation measurement processing unit 215 measures a variation in measurement results of RTTs, which are measured by the RTT measurement processing unit 214. More specifically, the RTT deviation measurement processing unit 215 calculates an RTT_smooth, which is a smoothed RTT value. Further, the RTT deviation measurement processing unit 215 calculates an RTT_deviation, which is a statistical value (for example, a dispersion value or a standard deviation) of deviations of the RTT_smooth.

A delayed ACK information generation unit 216 generates delayed ACK information containing a delayed ACK timer value according to a predetermined format. The delayed ACK information may contain delayed ACK function information that indicates whether a delayed ACK function is enabled or disabled, and transmission frequency information that indicates how many times of reception of a TCP data packet causes an ACK packet to be transmitted once.

In the present example, the communication apparatus 101 transmits a delayed ACK every time the communication apparatus 101 receives three TCP data packets. In other words, the transmission frequency of a delayed ACK is once in every three times. A delayed ACK is transmitted in response to reception of a third TCP data packet. Further, if the communication apparatus 101 receives less than three TCP data packets from a start of the reception and after transmission of a delayed ACK, the communication apparatus 101 transmits a delayed ACK when a delayed ACK timer time has elapsed from reception of a last TCP data packet. The delayed ACK timer time is a time period set as the delayed ACK timer value.

A delayed ACK information transmission processing unit 217 provides the delayed ACK information generated by the delayed ACK information generation unit 216 to a SYN packet as a TCP header option. If delayed ACK information is provided to a TCP header option of a SYN packet when the SYN packet is received, a delayed ACK information reception processing unit 218 acquires the delayed ACK information and stores it.

An RTO minimum value determination unit 219 acquires a delayed ACK timer value of a communication partner apparatus from the delayed ACK information stored by the delayed ACK information reception processing unit 218. Further, the RTO minimum value determination unit 219 acquires the RTT_smooth and the RTT_deviation calculated by the RTT deviation measurement processing unit 215. Further, the RTO minimum value determination unit 219 determines a minimum value of the RTO time by using the acquired RTT_smooth and RTT_deviation.

The RTO minimum value is calculated by using the following equation (1).

$$\text{RTO minimum value} = (\text{RTT\_smooth} + \text{delayed ACK timer value}) + \text{RTT\_deviation} * K + \text{alpha} \quad (1)$$

In this equation, K represents a coefficient, and alpha represents a constant. The value of alpha may be determined depending on a value acquired from "(RTT_smooth+delayed ACK timer value)+RTT_deviation*K". The determined RTO minimum value is notified to the retransmission timer control unit 212, and is stored in the retransmission timer control unit 212.

The RTO minimum value may be calculated by using the following equation (2) to calculate more easily the RTO minimum value.

$$\text{RTO minimum value} = \text{delayed ACK timer value} + \text{beta} \quad (2)$$

In this equation, beta is a constant, but may be determined depending on the size of the delayed ACK timer value.

A transmission processing unit 220 performs transmission processing of a TCP data packet. A reception processing unit 221 performs reception processing of a TCP data packet. More specifically, the reception processing unit 221 receives a TCP data packet and transmits an ACK in response. The TCP data packet is a data packet in compliance with TCP.

FIG. 3 illustrates a flowchart realized by the control unit 206 reading out the program stored in the memory 205 when a communication function of the communication apparatus 101 is activated while the communication apparatus 101 and the partner apparatus 102 are connected to the LAN 103.

This flowchart will be described assuming that the communication apparatus 101 stores a plurality of pieces of image data captured and generated by a digital camera function in the memory 205. Processing for transmitting this plurality of pieces of image data to the partner apparatus 102 will be described below.

Upon activation of the communication function of the communication apparatus 101, in step S301, the control unit 206 initializes the RTO minimum value. During this initialization, the control unit 206 sets the RTO minimum value to be stored in the retransmission timer control unit 212. According to the present exemplary embodiment, the control unit 206 sets the RTO minimum value to one second, which is determined as a default value.

Next, when the image transfer application is executed by the application processing unit 204, in step S302, the connection processing unit 211 starts establishment processing of a TCP connection between the communication apparatus 101 and the partner apparatus 102 according to a request by the application processing unit 204. According to the present exemplary embodiment, the image transfer application is started by a user's instruction.

Next, in step S303, the connection processing unit 211 transmits a SYN packet including the delayed ACK information, which is stored in the memory 205 in advance, in a TCP header option. More specifically, first, the delayed ACK information generation unit 216 generates delayed ACK information in compliance with the format of a TCP header option based on the delayed ACK timer value set to the communication apparatus 101. Next, the delayed ACK information transmission processing unit 217 provides the TCP header option including the delayed ACK information to a SYN packet. Then, the connection processing unit 211 transmits the SYN packet. According to the present exemplary embodiment, the delayed ACK information contains the delayed ACK timer value, the information that indicates whether the communication apparatus 101 has the delayed ACK function, and the information that indicates how frequently the communication apparatus 101 transmits a delayed ACK. With the above-described processing, the partner apparatus 102 is notified of the delayed ACK information of the communication apparatus 101.

Upon reception of this SYN packet, the partner apparatus 102 also transmits a SYN+ACK packet that includes the delayed ACK information in a TCP header option. The SYN+ACK packet is a response signal for requesting establishment of a TCP connection, and replying to the SYN packet received from the communication apparatus 101.

After the communication apparatus 101 receives the SYN+ACK packet, in step S303, the delayed ACK information reception processing unit 218 acquires the delayed ACK information from the TCP header option included in the received packet, and stores the acquired information.

In this manner, the delayed ACK information of the communication apparatus 101 and the delayed ACK information of the partner apparatus 102 are shared between the communication apparatus 101 and the partner apparatus 102 with use of the SYN packet.

Upon the reception of the SYN+ACK packet, in step S304, the connection processing unit 211 transmits an ACK packet in response to the received SYN+ACK packet to complete the establishment processing of the TCP connection. Upon the establishment of the TCP connection, in step S305, the transmission processing unit 220 transmits data requested by the application processing unit 204, and the RTT measurement processing unit 214 performs RTT measurement for the data transmission.

Next, in step S306, the application processing unit 204 determines whether the data transmission has been completed. According to the present exemplary embodiment, the application processing unit 204 determines whether transmission of the plurality of pieces of image data stored in the memory 205 has been completed.

If the application processing unit 204 determines that the data transmission/reception has been completed (YES in step S306), in step S307, the connection processing unit 211 cuts the TCP connection between the communication apparatus 101 and the partner apparatus 102. Then, the processing flow illustrated in FIG. 3 ends.

On the other hand, if the application processing unit 204 determines that the data transmission/reception has not been completed yet (NO in step S306), in step S308, the RTT deviation measurement processing unit 215 calculates a variation in RTT values measured by the RTT measurement processing unit 214. More specifically, the RTT deviation measurement processing unit 215 calculates the RTT_smooth, which is a smoothed RTT value, from previous RTT measurement results, and stores the calculated RTT_smooth. Further, the RTT deviation measurement processing unit 215 calculates the RTT_deviation, which is a statistical value (for example, a dispersion value or a standard deviation) of deviations of the RTT_smooth, and stores the calculated RTT_deviation.

Next, in step S309, the RTO minimum value determination unit 219 determines whether the RTO minimum value is updated after the initialization in step S301. According to the present exemplary embodiment, the RTO minimum value determination unit 219 determines that the RTO minimum value is updated already if the RTO minimum value has been updated once. However, updating the RTO minimum value is not limited thereto, and the RTO minimum value may be able to be updated again after a predetermined time period has elapsed, after a predetermined data amount is transmitted, and when the RTT_smooth exceeds a predetermined value or the RTT_smooth falls below a predetermined value conversely. Due to this arrangement, the RTO minimum value can be updated according to a communication state, whereby the communication is performed with use of the RTO minimum value appropriate to the latest communication state.

If the RTO minimum value is not updated yet (NO in step S309), the RTO minimum value determination unit 219 determines whether to determine the RTO minimum value at this timing. According to the present exemplary embodiment, the RTO minimum value determination unit 219 determines whether the RTT_deviation calculated by the RTT deviation measurement processing unit 215 is calculated based on samples of a number large enough for a statistically sufficiently reliable result. For example, according to the present exemplary embodiment, the RTO minimum value determination unit 219 determines to perform the RTO minimum value determination if the number of transmitted packets reaches ten. If the RTO minimum value determination unit 219 determines to perform the RTO minimum value determination (YES in step S310), the processing proceeds to step S311. If the RTO minimum value determination unit 219 determines not to perform the RTO minimum value determination yet (NO in step S310), the processing returns to step S305 again.

When the RTO minimum value is determined, the RTO minimum value determination unit 219 acquires the delayed ACK timer value of the partner apparatus 102 from the delayed ACK information stored by the delayed ACK information reception processing unit 218. Further, the RTO minimum value determination unit 219 acquires the RTT_smooth and the RTT_deviation calculated by the RTT deviation measurement processing unit 215.

Then, the RTO minimum value determination unit 219 determines the RTO minimum value with use of the above-described equation (1) or (2). According to the present exemplary embodiment, the RTO minimum value is set to be determined as 250 milliseconds as a result of the calculation. The RTO minimum value determination unit 219 notifies the retransmission timer control unit 212 of the thus-determined RTO minimum value, and the retransmission timer control unit 212 stores the RTO minimum value. Further, the RTO minimum value enters an updated state. After that, the processing returns to step S305.

Further, if the equation (2) is used to determine the RTO minimum value, the RTO minimum value can be determined before RTT measurement, whereby the RTO minimum value may be determined immediately after step S304.

In the manner as described above, the communication apparatus 101 can acquire the delayed ACK information from the partner apparatus 102, and determine the RTO minimum value.

As a result, an RTO minimum value can be prevented from increasing more than necessary, and a retransmission of data can be quickly performed if a situation requiring retransmission occurs during transmission of the data. Therefore, data communication performance can be improved in such a communication environment that retransmission may occur.

Further, the delayed ACK information such as the delayed ACK timer value acquired from the partner apparatus 102 may be displayed on a display device (not-illustrated). With this arrangement, a user can recognize the delayed ACK timer value of the partner apparatus 102, and for example, can use this information to find out a cause when the communication speed has decreased.

A method according to a second exemplary embodiment for notifying the partner apparatus 102 of the delayed ACK information with use of an application will be described below in the retransmission timer control processing when a TCP transmission is performed to the network using Ethernet, which has been described in the description of the first exemplary embodiment.

A system configuration according to the second exemplary embodiment is similar to the first exemplary embodiment, and is illustrated in FIG. 1.

FIG. 4 illustrates functional blocks of the communication apparatus 101 according to the second exemplary embodiment. Blocks similar to the first exemplary embodiment are identified by the same reference numerals, and only a difference from FIG. 2 according to the first exemplary embodiment will be described below.

Further, in the present exemplary embodiment, the partner apparatus 102 also includes the functional blocks illustrated in FIG. 4.

The difference between FIG. 2 and FIG. 4 is that a delayed ACK information generation unit 401, a delayed ACK information transmission processing unit 402, and a delayed ACK information reception processing unit 403 are provided outside a TCP processing unit 400.

The delayed ACK information generation unit 401 generates delayed ACK information including a delayed ACK timer value according to a predetermined format, according to a request from the application processing unit 204. Further, the delayed ACK information may include the information that indicates whether the delayed ACK function is enabled or disabled. Further, the delayed ACK information may include the transmission frequency information that indicates how many times of reception of a TCP data packet causes the communication apparatus 101 to transmit an ACK packet once.

The delayed ACK information transmission processing unit 402 transmits the delayed ACK information as TCP data according to a request from the application processing unit 204. The delayed ACK information reception processing unit 403 discriminates delayed ACK information from received TCP data to acquire and store the delayed ACK information, according to a request from the application processing unit 204.

The TCP processing unit 400 is configured not to include the delayed ACK information generation unit 216, the delayed ACK information transmission processing unit 217, and the delayed ACK information reception processing unit 218 among the functional blocks included in the TCP processing unit 201 according to the first exemplary embodiment.

FIG. 5 illustrates a flowchart realized by the control unit 206 reading out the program stored in the memory 205 when the communication function of the communication apparatus 101 is activated while the communication apparatus 101 and the partner apparatus 102 are connected to the LAN 103. Steps involving processes similar to FIG. 3 according to the first exemplary embodiment are identified by the same step numbers, and will be briefly described.

First, upon activation of the communication function of the communication apparatus 101, in step S301, the control unit 206 initializes the RTO minimum value. Next, when the image transfer application is executed by the application processing unit 204, in step S501, the connection processing unit 211 starts establishment of a TCP connection between the communication apparatus 101 and the partner apparatus 102 according to a request from the application processing unit 204. At this time, the connection processing unit 211 transmits a SYN packet that does not include the delayed ACK information of the communication apparatus 101. Then, the partner apparatus 102 transmits a SYN+ACK packet that does not include the delayed ACK information of the partner apparatus 102. Upon reception of the SYN+ACK packet, the connection processing unit 211 completes the establishment of the TCP connection by transmitting an ACK.

Upon the establishment of the TCP connection, in step S502, the application processing unit 204 prepares delayed ACK information containing the delayed ACK timer value as application data according to a predetermined format with use of the delayed ACK information generation unit 401. Then, the application processing unit 204 transmits the delayed ACK information as TCP data with use of the delayed ACK information transmission processing unit 402.

The partner apparatus 102 acquires the delayed ACK information from the received data, and the partner apparatus 102 also transmits the delayed ACK information of the partner apparatus 102 as TCP data.

Upon reception of the TCP data, the application processing unit 204 determines whether the received data is the delayed ACK information with use of the delayed ACK information reception processing unit 403. If the application processing unit 204 determines that the received data is the delayed ACK information, the application processing unit 204 acquires the delayed ACK information and stores it.

In this manner, the delayed ACK information of the communication apparatus 101 and the delayed ACK information of the partner apparatus 102 are shared between the communication apparatus 101 and the partner apparatus 102 with use of the application data.

Then, the communication apparatus 101 calculates and updates the RTO minimum value based on the shared delayed ACK information of the partner apparatus 102 in a similar manner to steps S305 to S311 illustrated in FIG. 3 according to the first exemplary embodiment.

As described above, the communication apparatus 101 acquires the delayed ACK information from the partner apparatus 102, and determines the RTO minimum value.

As a result, an RTO minimum value can be prevented from increasing more than necessary, and a retransmission of data can be quickly performed if a situation requiring retransmission occurs during transmission of the data. Therefore, data communication performance can be improved in such a communication environment that retransmission may occur.

A method according to a third exemplary embodiment for notifying the partner apparatus 102 of the delayed ACK information by attaching it to an ACK packet will be described in the retransmission timer control processing when a TCP transmission is performed to the network using Ethernet, which has been described in the description of the first exemplary embodiment.

A system configuration according to the third exemplary embodiment is similar to the first exemplary embodiment, and is illustrated in FIG. 1. Further, the communication apparatus 101 includes the functional blocks illustrated in FIG. 2 in a similar manner to the first exemplary embodiment. Further, in the present exemplary embodiment, the partner apparatus 102 also includes the functional blocks illustrated in FIG. 1.

According to the present exemplary embodiment, the delayed ACK information transmission processing unit 217 provides the delayed ACK information for an ACK packet of TCP according to a predetermined format. According to the present exemplary embodiment, the delayed ACK information is added by providing a TCP header option to the ACK packet. Further, upon reception of an ACK packet, the delayed ACK information reception processing unit 218 acquires the delayed ACK information and stores it if the delayed ACK information is provided for the ACK packet.

FIG. 6 illustrates a flowchart realized by the control unit 206 reading out the program stored in the memory 205 when the communication function of the communication apparatus 101 is activated while the communication apparatus 101 and the partner apparatus 102 are connected to the LAN 103. Steps for performing processing similar to the processing illustrated in FIG. 3 according to the first exemplary embodiment and the processing illustrated in FIG. 5 according to the second exemplary embodiment are identified by the same step numbers, and the descriptions thereof are omitted herein.

After the TCP connection is established by performing steps S301 and S501, in step S601, if the communication apparatus 101 is a data transmission side, the transmission processing unit 220 transmits data requested by the application processing unit 204, and RTT measurement is also performed for the data transmission. At this time, upon reception of an ACK packet to the transmitted data, the delayed ACK information reception processing unit 218 determines whether the delayed ACK information is provided for the ACK packet. According to the present exemplary embodiment, the delayed ACK information is provided as a TCP header option, whereby the delayed ACK information reception processing unit 218 can make determination by checking a TCP header option. If the delayed ACK information reception processing unit 218 determines that the delayed ACK information of the partner apparatus 102 is provided for the ACK packet, the delayed ACK information reception processing unit 218 acquires the delayed ACK information and stores it.

On the other hand, if the communication apparatus 101 is a data reception side, in step S601, the reception processing unit 221 receives data requested by the application processing unit 204, and transmits an ACK packet of TCP for that data reception. At this time, the delayed ACK information transmission processing unit 217 provides the delayed ACK information as a TCP header option of the ACK packet. The delayed ACK information may be provided only when the communication apparatus 101 transmits an ACK packet for the first time in the data packet reception. Alternatively, the delayed ACK information may be provided periodically. Further alternatively, if the delayed ACK information is changed after the delayed ACK information is already provided, the delayed ACK information may be provided again. Further alternatively, the delayed ACK information may be provided if an ACK packet is a delayed ACK.

Further, if the communication apparatus 101 is configured so as to notify the partner apparatus 102 of the delayed ACK information at the time of transmission of a delayed ACK, the delayed ACK information may contain information indicating that the ACK is a delayed ACK. This arrangement allows the reception side of the notification of the delayed ACK information to determine which ACK corresponds to a delayed ACK. As a result, an RTT measurement value of data corresponding to the delayed ACK can be stored as an RTT_delay ACK, and the RTO minimum value can be calculated by using the following equation (3).

$$\text{RTO minimum value} = \text{RTT\_delay ACK} - \text{RTT\_smooth} \quad (3)$$

Further, if the communication apparatus 101 is configured so as to notify the partner apparatus 102 of the delayed ACK information at the time of transmission of a delayed ACK, the delayed ACK information may contain the transmission frequency information that indicates a setting as to how many times of reception of a TCP data packet causes the communication apparatus 101 to transmit an ACK packet once. This arrangement allows the reception side of the notification of the delayed ACK information to transmit data in a data transmission pattern that leads to occurrence of a delayed ACK at the partner terminal. As a result, the reception side of the notification of the delayed ACK information can determine which ACK corresponds to a delayed ACK, store an RTT measurement value of data corresponding to the delayed ACK as the RTT_delay ACK, and calculate the RTO minimum value with use of the above-described equation (3).

As described above, the communication apparatus 101 can acquire the delayed ACK information from the partner apparatus 102, and determine the RTO minimum value.

As a result, the communication apparatus 101 can prevent the RTO minimum value from increasing more than necessary, and a retransmission of data can be quickly performed if a situation requiring retransmission occurs during transmission of the data. Therefore, the data communication performance can be improved in such a communication environment that retransmission may occur.

According to the above-described first to third exemplary embodiments, the communication apparatus 101 notifies the partner apparatus 102 of the delayed ACK timer value. However, the communication apparatus 101 may be configured so as to switch whether to notify the partner apparatus 102 of the delayed ACK timer value based on a predetermined condition. For example, the communication apparatus 101 notifies the partner apparatus 102 of the delayed ACK timer value when performing high-speed communication, for example, for transmission of audio data, moving image data, and the like, while the communication apparatus 101 refrains from notifying the partner apparatus 102 of the delayed ACK timer value when low-speed communication is sufficient, for example, for transmission of document data, still image data, and the like. As a result, the data communication performance can be improved even when retransmission occurs because notification of the delayed ACK timer value is performed when transmitting a data type that requires high-speed communication. Further, communication resources can be saved because notification of the delayed ACK timer value is not performed when transmitting a data type that does not require high-speed communication.

Further, the communication apparatus 101 may be configured so as to notify the partner apparatus 102 of the delayed ACK timer value according to a protocol used in a higher layer than the TCP layer. For example, the communication apparatus 101 notifies the partner apparatus 102 of the delayed ACK timer value when using File Transfer Protocol (FTP) for which high-speed communication is desirable, while the communication apparatus 101 refrains from notifying the partner apparatus 102 of the delayed ACK timer value when using Simple Mail Transfer Protocol (SMTP) for which low-speed communication is sufficient. As a result, the data communication performance can be improved even when retransmission occurs because notification of the delayed ACK timer value is performed when high-speed communication is required. Further, communication resources can be saved because notification of the delayed ACK timer value is not performed when high-speed communication is not required.

Further, the communication apparatus 101 may notify the partner apparatus 102 of the delayed ACK timer value according to a user's setting. As a result, a user can select whether improvement of the data communication performance should be prioritized or saving communication resources should be prioritized.

Further, the communication apparatus 101 may notify the partner apparatus 102 of the delayed ACK information by the plurality of methods according to the first to third exemplary embodiments described above. Further, in the first to third exemplary embodiments, the partner apparatus 102 may transmit information that indicates reception of the delayed ACK information upon the reception of the delayed ACK information.

A method where information indicating that the delayed ACK function is disabled is provided for the delayed ACK information will be described in the retransmission timer control processing when performing TCP transmission to the network using Ethernet, according to the first to third exemplary embodiments described above.

If the communication apparatus 101 acquires the delayed ACK information of which the communication apparatus 101 is notified by the partner apparatus 102 by any of the methods according to the first to third exemplary embodiments, and the delayed ACK information contains information that allows the communication apparatus 101 to determine that the delayed ACK function is disabled, the communication apparatus 101 can determine the RTO minimum value in the following manner.

A method is controlling the RTO minimum value in such a manner that no lower limit value is set. More specifically, the RTO value is constantly updated based on an RTT measurement result. If the RTO value is updated in such a manner that a value calculated becomes smaller according to an RTT measurement result, such an update is not limited because no lower limit is set to the RTO minimum value.

Another method is changing the RTO minimum value to a smaller value if the initial value of the RTO minimum value is set to one second. For example, the RTO minimum value is changed to 100 milliseconds.

The above-described two methods are effective, because the partner apparatus 102 does not perform a delayed ACK timer operation in the first place so that spurious retransmission is never caused by a delayed ACK timer operation, whereby controlling retransmission in consideration of only the RTT is sufficient.

As described above, the communication apparatus 101 can acquire the delayed ACK information from the partner apparatus 102, and determine the RTO minimum value.

As a result, an RTO minimum value can be prevented from increasing more than necessary, and a retransmission of data can be quickly performed if a situation requiring retransmission occurs during transmission of the data. Therefore, data communication performance can be improved in such a communication environment that retransmission may occur.

According to the present invention, notification of time period information from reception of a packet to transmission of a reply to the packet can be performed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (trademark), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-058330 filed Mar. 21, 2013, which is hereby incorporated by reference herein in its entirety.

The invention claimed is:

1. A communication apparatus comprising:
a reception unit configured to receive a packet from another communication apparatus;
a transmission unit configured to transmit, after a predetermined time period has elapsed without another packet having been received from the other communication apparatus since the reception unit receives the packet, a response to the packet received by the reception unit to the other communication apparatus; and
a notification unit configured to notify the other communication apparatus of information of the predetermined time period,
wherein the transmission unit transmits the reply to the other communication apparatus before the predetermined time period has elapsed if a predetermined number of packets are received by the reception unit.

2. The communication apparatus according to claim 1, wherein the transmission unit transmits an ACK packet as the reply to the packet received by the reception unit.

3. The communication apparatus according to claim 1, wherein the predetermined time period is a delayed acknowledgement (ACK) timer time defined by transmission control protocol (TCP).

4. The communication apparatus according to claim 1, wherein the information of the predetermined time period is included in a request signal for establishing a connection between the communication apparatus and the other communication apparatus.

5. The communication apparatus according to claim 1, wherein the information of the predetermined time period is included in application data.

6. The communication apparatus according to claim 1, wherein the information of the predetermined time period is included in the reply to the packet received by the reception unit.

7. The communication apparatus according to claim 1, wherein the notification unit notifies the other communication apparatus of the predetermined time period according to a predetermined condition.

8. The communication apparatus according to claim 1, wherein the notification unit notifies the other communication apparatus of the predetermined time period according to a type of data to be communicated to the other apparatus.

9. The communication apparatus according to claim 1, wherein the notification unit notifies the other communication apparatus of the predetermined time period according to a type of a protocol to be used in communication with the other communication apparatus.

10. The communication apparatus according to claim 1, wherein the notification unit notifies the other communication apparatus of the predetermined time period based on an instruction by a user.

11. A communication apparatus configured to communicate with another communication apparatus, the communication apparatus comprising:
a transmission unit configured to transmit a packet to the other communication apparatus;
an acquisition unit configured to acquire time period information from reception of the packet, by the other communication apparatus, transmitted from the transmission unit until transmission of a reply to the packet by the other communication apparatus; and
a determination unit configured to perform determination processing regarding a time period until retransmission of the packet by the transmission unit based on the time period information acquired by the acquisition unit,
wherein the other communication apparatus transmits, after a time period indicated by the time period information has elapsed without another packet having been received from the communication apparatus since reception of the packet from the communication apparatus, a response to the packet received from the communication apparatus.

12. The communication apparatus according to claim 11, wherein the time period information is a delayed acknowledgement (ACK) timer time defined by transmission control protocol (TCP).

13. The communication apparatus according to claim 11, wherein the determination unit determines a value to be used as a minimum value of the time period until the retransmission of the packet by the transmission unit based on the time period information acquired by the acquisition unit.

14. The communication apparatus according to claim 11, further comprising a measurement unit for measuring a time period from the transmission of the packet by the transmission unit until reception of a reply to the packet,
wherein the determination unit performs the determination processing regarding the time period until the retransmission of the packet by the transmission unit based on the time period information acquired by the acquisition unit and the time period measured by the measurement unit.

15. The communication apparatus according to claim 11, further comprising a display unit for displaying the time period information acquired by the acquisition unit on a display device.

16. The communication apparatus according to claim 11, further comprising a notification unit for notifying the other communication apparatus that the time period information is acquired if the acquisition unit has acquired the time period information.

17. A method for controlling a communication apparatus, the method comprising:
receiving a packet from another communication apparatus;
transmitting, after a predetermined time period has elapsed without another packet having been received from the other communication apparatus since the receiving receives the packet, a response to the packet received by the receiving to the other communication apparatus;
notifying the other communication apparatus of information of the predetermined time period; and
transmitting the reply to the other communication apparatus before the predetermined time period has elapsed if a predetermined number of packets are received.

18. A method for controlling a communication apparatus configured to communicate with another communication apparatus, the method comprising:
transmitting a packet to the other communication apparatus;
acquiring time period information from reception of the transmitted packet by the other communication apparatus until transmission of a reply to the packet by the other communication apparatus; and
performing determination processing regarding a time period until retransmission of the packet based on the acquired time period information,
wherein the other communication apparatus transmits, after a time period indicated by the time period information has elapsed without another packet having been received from the communication apparatus since reception of the packet from the communication apparatus, a response to the packet received from the communication apparatus.

19. A computer-readable storage medium storing a program that causes a computer to operate as a communication apparatus, the communication apparatus comprising:
a reception unit configured to receive a packet from another communication apparatus;
a transmission unit configured to transmit, after a predetermined time period has elapsed without another packet having been received from the other communication apparatus since the reception unit receives the packet, a response to the packet received by the reception unit to the other communication apparatus; and
a notification unit configured to notify the other communication apparatus of information of the predetermined time period,
wherein the transmission unit transmits the reply to the other communication apparatus before the predetermined time period has elapsed if a predetermined number of packets are received by the reception unit.

20. A computer-readable storage medium storing a program that causes a computer to operate as a communication apparatus, the communication apparatus comprising:
- a transmission unit configured to transmit a packet to the other communication apparatus;
- an acquisition unit configured to acquire time period information from reception of the packet, by the other communication apparatus, transmitted from the transmission unit until transmission of a reply to the packet by the other communication apparatus; and
- a determination unit configured to perform determination processing regarding a time period until retransmission of the packet by the transmission unit based on the time period information acquired by the acquisition unit,
- wherein the other communication apparatus transmits, after a time period indicated by the time period information has elapsed without another packet having been received from the communication apparatus since reception of the packet from the communication apparatus, a response to the packet received from the communication apparatus.

\* \* \* \* \*